United States Patent Office 3,284,488
Patented Nov. 8, 1966

1

3,284,488
PROCESS FOR PRODUCING HALF ESTER ACYL CHLORIDES OF AROMATIC DICARBOXYLIC ACIDS
Gustav Renckhoff, Witten (Ruhr), and Wolfgang Wolfes, Witten-Bommern, Germany, assignors to Chemische Werke Witten G.m.b.H., Witten (Ruhr), Germany
No Drawing. Filed Dec. 12, 1961, Ser. No. 158,878
Claims priority, application Germany, Dec. 29, 1960, C 23,058
9 Claims. (Cl. 260—475)

The present invention is directed to the production of half ester acyl chlorides of aromatic dicarboxylic acids, and more particularly to the production of the half ester acyl chlorides of isophthalic and terephthalic acids and their nuclear-substituted products.

It is already known that half ester acyl chlorides of dicarboxylic acids can be produced by reacting the dicarboxylic acid monoesters with thionyl chloride. This process is also applicable to the production of aromatic dicarboxylic acid half ester acyl chlorides. Such a reaction for the preparation of terephthalic acid half ester acyl chlorides by the action of thinoyl chloride on terephthalic acid monoester, for example, has been described in the Journal of Organic Chemistry, vol. 25, 819 (1960). When proceeding in accordance with this process, the half ester is obtained by partial saponification of the diesters with alkali and acidification of the resulting monoester salts. This method is, however, unsatisfactory for technical production of the compounds for various reasons: (1) the terephthalic acid diesters which must be used as the starting material are very costly; (2) the yield of monoesters is only about 65% and, at best, about 74%; and (3) the reaction with thionyl chloride proceeds very slowly. Also, the necessary separation of the monoesters by filtration and the careful drying operation required prior to the reaction with thionyl chloride render this particular method additionally complicated and time-consuming.

It has now been found, however, that the half ester acyl chlorides of aromatic dicarboxylic acids and of their nuclear-substitution products, especially of iso- and terephthalic acid, can be obtained in a good yield when the corresponding trichloromethylbenzoic acid esters of primary alcohols, preferably those having up to 5 carbon atoms and particularly the methyl ester, are heated with mono-, di-, or trichloroaectic acid in the presence of an acid catalyst, such as iron (III) chloride. The half ester acyl chloride is obtained in a yield of over 90% and can be easily separated by distillation from the corresponding chloroacetyl chloride which is also produced by the reaction.

The trichloromethylbenzoic acid esters required as a staring material for the reaction of the present invention are easily available in an excellent yield from $\alpha\alpha'$-hexachloroxylenes. The $\alpha\alpha'$-hexachloroxylenes are partially saponified to trichloromethylbenzoyl chlorides and are quantitatively converted to the esters by heating with alcohol. Trichloromethylbenzoic acid esters can also be prepared in a particularly advantageous manner from m- or p-toluic acid methyl esters by exhaustive chlorination under exposure to light at temperatures above 150° C. which produces the trichloromethylbenzoyl chlorides, and the subsequent reaction of such chlorides with alcohol to form the esters.

According to the present invention, the esters of aliphatic and aromatic alcohols can be used, for example, methyl-, ethyl-, propyl-, butyl-, and benzyl esters. The methyl esters are, however, preferred.

The preferred catalyst is iron (III) chloride; however, as catalysts, coordinately unsaturated, inorganic polyhalogen compounds such as, for example, zinc chloride, aluminum chloride, boron fluoride, antimony pentachloride, and others can be used. These substances are designated as acid-analogous substances, for example, according to the "Lehrbuch der Organischen Chemie" by Klages, volume 2, second edition, page 124. Accordingly, the term "acid catalyst" as used hereinatfer is intended to encompass such coordinately unsaturated, inorganic polyhalogen compounds.

The trichloromethylbenzoic acid esters are reacted, according to the present invention, with equimolecular amounts of mono-, di-, or trichloroacetic acid by heating to higher temperatures, particularly to temperatures between about 50 and 160° C., and preferably from 100 to 130° C., in the presence of an acid catalyst, preferably iron (III) chloride, in amounts of from 0.01 to 1%, preferably 0.1%. The half ester acyl chloride and the corresponding chloroacetyl chloride are formed while hydrogen chloride is cleaved off.

The reaction is terminated within a short time, after about 1–2 hours. Termination may be recognized by the cessation of the hydrogen chloride generation. During the reaction, the methyl esters react fastest and at the lowest reaction temperature, whereas the esters of higher normal alcohols require higher reaction temperatures and longer reaction times and generally do not render such high yields. With esters of secondary alcohols, for example, trichloromethylbenzoic acid-isopropyl ester or secondary trichloromethylbenzoic acid butyl ester, the reaction proposed by the present invention cannot be carried out: When these esters are heated with chloroacetic acid and iron (III) chloride, the separation of difficulty soluble, higher molecular reaction products takes place.

Since it is known from the literature that, for instance, dimethyl terephthalate reacts with hexachloro-p-xylene in the presence of iron (III) chloride to form terephthalic acid dichloride, it was to be expected that the trichloromethylbenzoic acid esters would react intramolecularly. It was surprising to find, therefore, that the esters of lower primary alcohols, particularly the methyl esters, do not enter into an intramolecular reaction between the trichloromethyl group and the ester group, but instead react evenly with the chlorinated acetic acid to produce the half ester acyl chloride and chloroacetyl chloride.

Since the yields of chloroacetyl chlorides are almost quantitative in this reaction, the process also represents an excellent method for preparing these compounds which are normally available only in a rather moderate yield by direct reaction of chloroacetic acid with thionyl chloride. Separation of the chloroacetyl chlorides from the aromatic dicarboxylic acid half ester acyl chlorides can be effected without difficulty on the basis of the vast differences in boiling points between these compounds.

The half ester acyl chlorides of aromatic dicarboxylic acids are valuable intermediate products for the production of synthetic materials by polycondensation.

It is an object of the present invention, therefore, to provide a new and improved process for the production of the half ester acyl chlorides of aromatic dicarboxylic acids, and more particularly of iso- and terephthalic acids.

Other objects of the present invention will become apparent from the description hereinafter.

The following examples serve to illustrate the present invention without, however, limiting the same.

*Example I*

1,050 parts by weight of p-toluic acid methyl ester are chlorinated at a temperature of from 180 to 200° C. under exposure to the light of a 500 watt lamp, until weight constancy has been attained and no hydrogen chloride is present in the waste gases. The resulting trichloromethylbenzoyl chloride (B.P.$_{13}$ 156–157.5°, saponifiable chlorine 55.15%) is dropped while being cooled into 2,500 parts by volume of methanol at a temperature of from 30 to 40° C. When this addition is completed, stirring is effected for two hours at 50° C. and the methanol is subsequently completely evaporated. The resulting crude p-trichloromethylbenzoic acid methyl ester (1,540 parts by weight equal to 87% referred to the toluic acid methyl ester used) is heated with 574 parts by weight of freshly distilled, water-free monochloroacetic acid and 0.75 part by weight of sublimated iron (III) chloride for about 2 hours to 100–120° C., until the brisk hydrogen chloride formation, which begins immediately, has ceased. The reaction mixture is then distilled with the addition of 1 part by weight of lauric acid diethyl amide as a stabilizer, whereby, first under atmospheric pressure, 618 parts by weight of chloroacetyl chloride (90% of the theory) distill over at a temperature of from 102–110° C. The distillation is then continued in vacuo at 13 torr and the resulting product, at the boiling point of 146–148° C., amounts to 1,090 parts of terephthalic acid methyl ester chloride (melting point 52–54° C., saponifiable chlorine 18.0%), corresponding to 90.5% of the theory referred to trichloromethylbenzoic acid ester.

*Example II*

253.5 parts by weight of m-trichloromethylbenzoic acid methyl ester, prepared from m-toluic acid methyl ester, as described in Example I, and 163.5 parts by weight of trichloroacetic acid are heated to 120–130° C. with 0.1 part by weight of iron (III) chloride until the brisk hydrogen chloride formation, which begins immediately, has ceased after about 1½ hours. By the distillation of the reaction mixture with the addition of 0.2 part by weight of lauric acid diethyl amide, 166 parts by weight (91% of the theory) of trichloroacetylchloride are obtained, first at 118–120°/760 mm. Subsequently, 177 parts by weight of isophthalic acid methyl ester chloride (solidification (or freezing) point 15° C., saponification number 851) which represents 89% of the theory, are distilled in vacuo of 16 torr at 151–153° C.

If, instead of trichloromethylbenzoic acid methyl ester, the corresponding ethyl-, propyl-, or butyl esters are used in the foregoing examples, the tere- and, respectively, isophthalic acid half ester acyl chlorides of these alcohols are obtained in an analogous manner. The yields, however, are lower than when using the methyl esters.

*Example III*

288 parts by weight of p-chloro-m-trichloromethylbenzoic acid methyl ester are heated to 100–120° C. with 129 parts by weight of dichloroacetic acid with the addition of 0.3 part by weight of sublimated iron (III) chloride until the formation of hydrogen chloride is terminated. By distillation at atmospheric pressure, 139 parts by weight of dichloroacetyl chloride, corresponding to 95% of the theory, are subsequently isolated; and by the then following vacuum distillation, 181 parts by weight, corresponding to 78% of the theory, of 4-chloroisophthalic acid methyl ester chloride (B.P.$_{18}$ 178–180°) are then isolated. The p-chloro-m-trichloromethylbenzoic acid methyl ester serving as the starting material was prepared by chlorination of p-chloro-m-toluic acid methyl ester at 180° C. under exposure to light and heating of the p-chloro-m-toluic acid chloride, which boils at 184–186° C. at 22 mm., with methanol. For the reaction with chloroacetic acid, the crude methyl ester is utilized which remains as residue upon evaporation of the excess amount of methanol.

*Example IV*

127 parts by weight of p-trichloromethylbenzoic acid methyl ester were stirred with 47.3 parts by weight of monochloroacetic acid while adding 0.15 part by weight of antimony pentachloride. After adding the catalyst, slow cleavage of hydrogen chloride began at room temperature. In order to expedite the reaction, the mixture was heated to 80° C. whereby the separation of hydrogen chloride became very brisk so that the reaction was terminated after 30 minutes. After distillation, 53 g. of chloroacetyl chloride and 92 g. of terephthalic acid methyl ester chloride were obtained, corresponding to a yield of 93.6%.

*Example V*

127 parts by weight of m-trichloromethylbenzoic acid methyl ester were heated to 140° C. for 1¼ hours together with 47.3 parts by weight of monochloroacetic acid while adding 0.15 part by weight of freshly melted zinc chloride until the evolution of hydrogen chloride was terminated. After distillation of the reaction mixture and with the addition of 0.5 part by weight of lauric acid diethylamide, 47 parts of weight of chloroacetyl chloride and 78 parts by weight of isophthalic acid methyl ester chloride were obtained, corresponding to a yield of 81%.

*Example VI*

127 parts by weight of p-trichloromethylbenzoic acid methyl ester were heated to 180° C. for 6 hours together with 47.3 parts by weight of monochloroacetic acid while adding 0.3 part by weight of water-free aluminum chloride until the evolution of hydrogen chloride ceased. After distillation, 29 parts by weight of chloroacetyl chloride and 47 parts by weight of terephthalic acid methyl ester chloride were obtained.

*Example VII*

239 parts by weight of p-trichloromethylbenzoic acid ethyl ester, produced from trichloromethyl benzoyl chloride and ethyl alcohol in a manner analogous to that described in Example I, were heated to 100–150° C. for about three hours with 84.5 parts by weight of monochloroacetic acid while adding 0.3 part by weight of sublimated iron (III) chloride until the evolution of hydrogen chloride ceased. When the reaction mixture was distilled, 92.5 parts by weight of chloroacetyl chloride (92% of the theory) and 150 parts by weight of terephthalic acid ethyl ester chloride were obtained at a boiling point of 133–134° C. at 6 mm. and a melting point of 26.5–27° C. This corresponds to a yield of 79%.

*Example VIII*

649 parts by weight of p-trichloromethylbenzoic acid butyl ester, produced from trichloromethyl benzoyl chloride and butanol, in a manner analogous to Example I, were heated to 140–170° C. for two hours with 208 parts by weight of freshly distilled monochloroacetic acid and 0.3 part by weight of iron (III) chloride until the separation of hydrogen chloride was terminated. When the reaction mixture was distilled with the addition of 1 part by weight of lauric acid diethylamide, 180 parts by weight, corresponding to 72.5% of the theory, of chloroacetyl chloride and 389 parts by weight, corresponding to 74% of the theory, of terephthalic acid butyl ester chloride were obtained. The same distilled at 11 torr at 174–179° C. The melting point was 12.5–13.5° C.

*Example IX*

419 parts by weight of p-trichloromethyldichlorobenzoic acid methyl ester were heated to 120–140° C. for 7 hours with 123 parts by weight of freshly distilled monochloroacetic acid and 0.4 part by weight of iron (III) chloride until the evolution of hydrogen chloride was terminated. With distillation of the reaction mixture, 120 g. of chloroacetyl chloride were obtained, which corresponds to 84% of the theory. At a temperature of 185–190° C. and at 20 torr, 260 g. of dichloroterephthalic acid methyl ester chloride were distilled, which corresponds to a yield of 74% of the theory.

The p-trichloromethyldichlorobenzoic acid methyl ester was prepared by chlorination of p-trichloromethyl benzoyl chloride with the addition of 0.05% of iron (III)

chloride and the exclusion of light until 2 chlorine atoms were absorbed and the acid chloride reacted with methanol to form the ester.

Since changes may be made in carrying out the above process without departing from the scope of the invention, it is intended that all matter contained in the above description will be interpreted as illustrative and not in a limiting sense.

We claim:

1. A process for the production of half ester acyl chlorides of benzene dicarboxylic acids and the nuclear-chlorine substituted derivatives thereof which comprises heating an ester selected from the group consisting of trichloromethylbenzoic acid esters of primary alkanols containing from 1 to 5 carbon atoms and nuclear-chlorine substituted trichloromethylbenzoic acid esters of primary alkanols containing from 1 to 5 carbon atoms with a chloroacetic acid selected from the group consisting of monochloroacetic acid, dichloroacetic acid and trichloroacetic acid in the presence of a coordinately unsaturated inorganic polyhalogen compound as catalyst at a temperature of between about 50° and 160° C.

2. The process of claim 1, wherein said ester is m-trichloromethylbenzoic acid methyl ester.

3. The process of claim 1, wherein said ester is p-trichloromethylbenzoic acid methyl ester.

4. The process of claim 1, wherein said heating is carried out at a temperature of between about 100° and 130° C.

5. The process of claim 1, wherein said coordinately unsaturated inorganic polyhalogen compound is employed in amounts of from 0.01 to 1% by weight.

6. The process of claim 1, wherein the primary alkanol is methanol.

7. A process for the production of half ester acyl chlorides of benzene dicarboxylic acids and the nuclear-chlorine substituted derivatives thereof which comprises heating an ester selected from the group consisting of trichloromethylbenzoic acid esters of primary alkanols containing from 1 to 5 carbon atoms and nuclear-chlorine substituted trichloromethylbenzoic acid esters of primary alkanols containing from 1 to 5 carbon atoms with a chloroacetic acid selected from the group consisting of monochloroacetic acid, dichloroacetic acid and trichloroacetic acid at a temperature of between about 50° and 160° C. in the presence of 0.01 to 1% by weight of a coordinately unsaturated inorganic polyhalogen compound as catalyst and separating the resultant half ester acyl chloride from the reaction mixture.

8. A process for the production of half ester acyl chlorides of benzene dicarboxylic acids and the nuclear-chlorine substituted derivatives thereof which comprises heating an ester selected from the group consisting of trichloromethylbenzoic acid esters of primary alkanols containing from 1 to 5 carbon atoms and nuclear-chlorine substituted trichloromethylbenzoic acid esters of primary alkanols containing from 1 to 5 carbon atoms with a chloroacetic acid selected from the group consisting of monochloroacetic acid, dichloroacetic acid and trichloroacetic acid in the presence of a catalyst selected from the group consisting of iron (III) chloride, zinc chloride, aluminum chloride, boron fluoride and antimony pentachloride at a temperature of between about 50° and 160° C.

9. The process of claim 8, wherein said catalyst is iron (III) chloride.

References Cited by the Examiner

UNITED STATES PATENTS

| | | | |
|---|---|---|---|
| 1,965,556 | 7/1934 | Mills | 260—544 |
| 2,525,722 | 10/1950 | Rabjohn | 260—544 |
| 2,525,723 | 10/1950 | Rabjohn | 260—544 |

OTHER REFERENCES

Wagner et al.: Synthetic Organic Chemistry (New York, 1953), page 481.

Wagner et al.: Synthetic Organic Chemistry (New York, 1953), pages 547–8, 418.

LORRAINE A. WEINBERGER, DUVAL McCUTCHEN, LEON ZITVER, *Examiners.*

A. D. ROLLINS, R. E. MASSA, T. L. GALLOWAY, *Assistant Examiners.*